(12) United States Patent
Lin

(10) Patent No.: US 11,013,006 B2
(45) Date of Patent: May 18, 2021

(54) METHOD AND APPARATUS FOR BEAM TRACKING IN A WIRELESS COMMUNICATION SYSTEM

(71) Applicant: ASUSTek Computer Inc., Taipei (TW)

(72) Inventor: Ko-Chiang Lin, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 15/863,553

(22) Filed: Jan. 5, 2018

(65) Prior Publication Data

US 2018/0132221 A1 May 10, 2018

Related U.S. Application Data

(62) Division of application No. 15/005,485, filed on Jan. 25, 2016, now abandoned.

(60) Provisional application No. 62/107,906, filed on Jan. 26, 2015, provisional application No. 62/107,922, filed on Jan. 26, 2015, provisional application No. 62/107,960, filed on Jan. 26, 2015.

(51) Int. Cl.
| | |
|---|---|
| *H04W 72/04* | (2009.01) |
| *H04W 74/08* | (2009.01) |
| *H04L 5/00* | (2006.01) |
| *H04W 72/08* | (2009.01) |
| *H04W 74/00* | (2009.01) |
| *H04W 88/02* | (2009.01) |

(52) U.S. Cl.
CPC ......... *H04W 72/046* (2013.01); *H04L 5/0048* (2013.01); *H04W 72/042* (2013.01); *H04W 72/085* (2013.01); *H04W 74/0833* (2013.01); *H04W 74/006* (2013.01); *H04W 88/02* (2013.01)

(58) Field of Classification Search
CPC ............. H04W 72/046; H04W 72/085; H04W 72/042; H04W 74/0833; H04W 88/02; H04W 74/006; H04L 5/0048
See application file for complete search history.

(56) References Cited

U.S. PATENT DOCUMENTS

| | | | | |
|---|---|---|---|---|
| 2011/0007688 | A1* | 1/2011 | Veeravalli | H04W 16/14 370/328 |
| 2011/0105167 | A1* | 5/2011 | Pan | H04B 7/0671 455/507 |
| 2012/0320874 | A1* | 12/2012 | Li | H04W 48/12 370/331 |
| 2013/0039202 | A1* | 2/2013 | Feuersanger | H04L 5/001 370/252 |
| 2013/0155974 | A1* | 6/2013 | Papasakellariou | H04W 72/042 370/329 |
| 2014/0064233 | A1* | 3/2014 | Oizumi | H04L 1/1854 370/329 |
| 2014/0241242 | A1* | 8/2014 | Josiam | H04W 88/02 370/328 |
| 2016/0057757 | A1* | 2/2016 | Papasakellariou | H04W 72/0413 370/335 |

(Continued)

*Primary Examiner* — Peter P Chau
(74) *Attorney, Agent, or Firm* — Cooper Legal Group, LLC

(57) ABSTRACT

A method and apparatus for handling transmission in a wireless communication system. In one embodiment, the method includes initiating a RA procedure, by a UE, in a serving cell. The method also includes deciding whether to transmit a RA Preamble, by the UE, in the serving cell at a specific timing during the RA procedure based on at least one information that includes beam(s) (or beam group(s)) of the serving cell detected by the UE.

20 Claims, 16 Drawing Sheets

(56) References Cited

U.S. PATENT DOCUMENTS

2017/0094531 A1* 3/2017 Kakishima ........... H04B 7/0617
2017/0257864 A1* 9/2017 Kakishima ................ H04J 1/00

* cited by examiner

METHOD AND APPARATUS FOR BEAM TRACKING IN A WIRELESS COMMUNICATION SYSTEM

CROSS-REFERENCE TO RELATED APPLICATIONS

This application is a Divisional of U.S. patent application Ser. No. 15/005,485, filed Jan. 25, 2016, which claims the benefit of U.S. Provisional Patent Application Ser. No. 62/107,906 filed on Jan. 26, 2015, U.S. Provisional Patent Application Ser. No. 62/107,922 filed on Jan. 26, 2015, and U.S. Provisional Patent Application Ser. No. 62/107,960 filed on Jan. 26, 2015, the entire disclosures of which are incorporated herein in their entirety by reference.

FIELD

This disclosure generally relates to wireless communication networks, and more particularly, to a method and apparatus for handling transmission in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

A method and apparatus for handling transmission in a wireless communication system. In one embodiment, the method includes initiating a Random Access (RA) procedure, by a UE, in a serving cell. The method also includes deciding whether to transmit a RA Preamble, by the UE, in the serving cell at a specific timing during the RA procedure based on at least one information that includes beam(s) (or beam group(s)) of the serving cell detected by the UE.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support the wireless technology discussed in the various documents, including: "DOCOMO 5G White Paper" by NTT Docomo, Inc. Furthermore, the exemplary wireless communication systems devices described below may be designed to support one or more standards such as the standard offered by a consortium named "3rd Generation Partnership Project" referred to herein as 3GPP, including: R2-145410, "Introduction of Dual Connectivity", NTT Docomo, Inc., NEC; TS 36.321 V12.3.0, "E-UTRA MAC protocol specification"; TS 36.331 V12.3.0, "E-UTRA RRC protocol specification"; TS 36.211 V12.3.0, "E-UTRA Physical Channels and Modulation"; TS 36.213 V12.3.0, "E-UTRA Physical layer procedures"; TS 36.212 V12.2.0, "E-UTRA Multiplexing and channel coding". The standards and documents listed above are hereby expressly incorporated by reference in their entirety.

Figure 1:
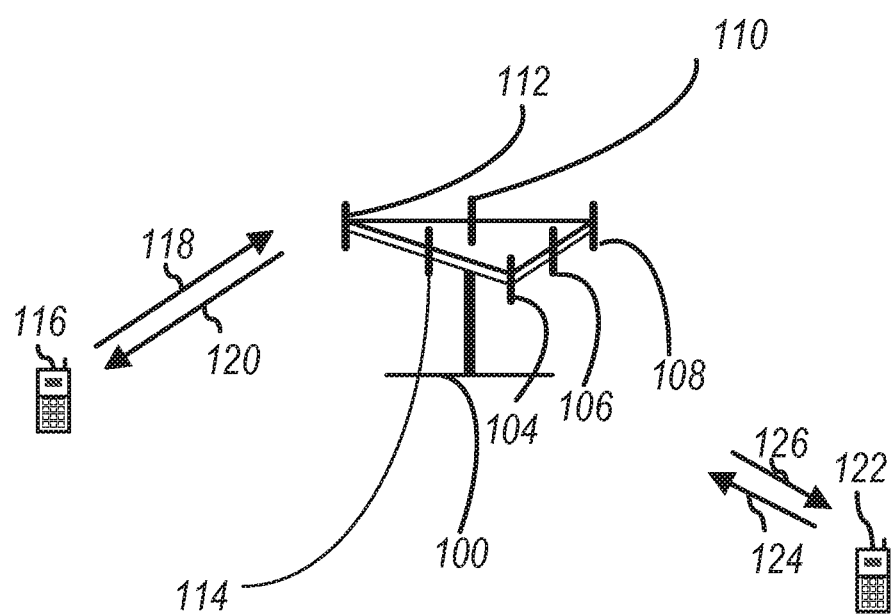
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
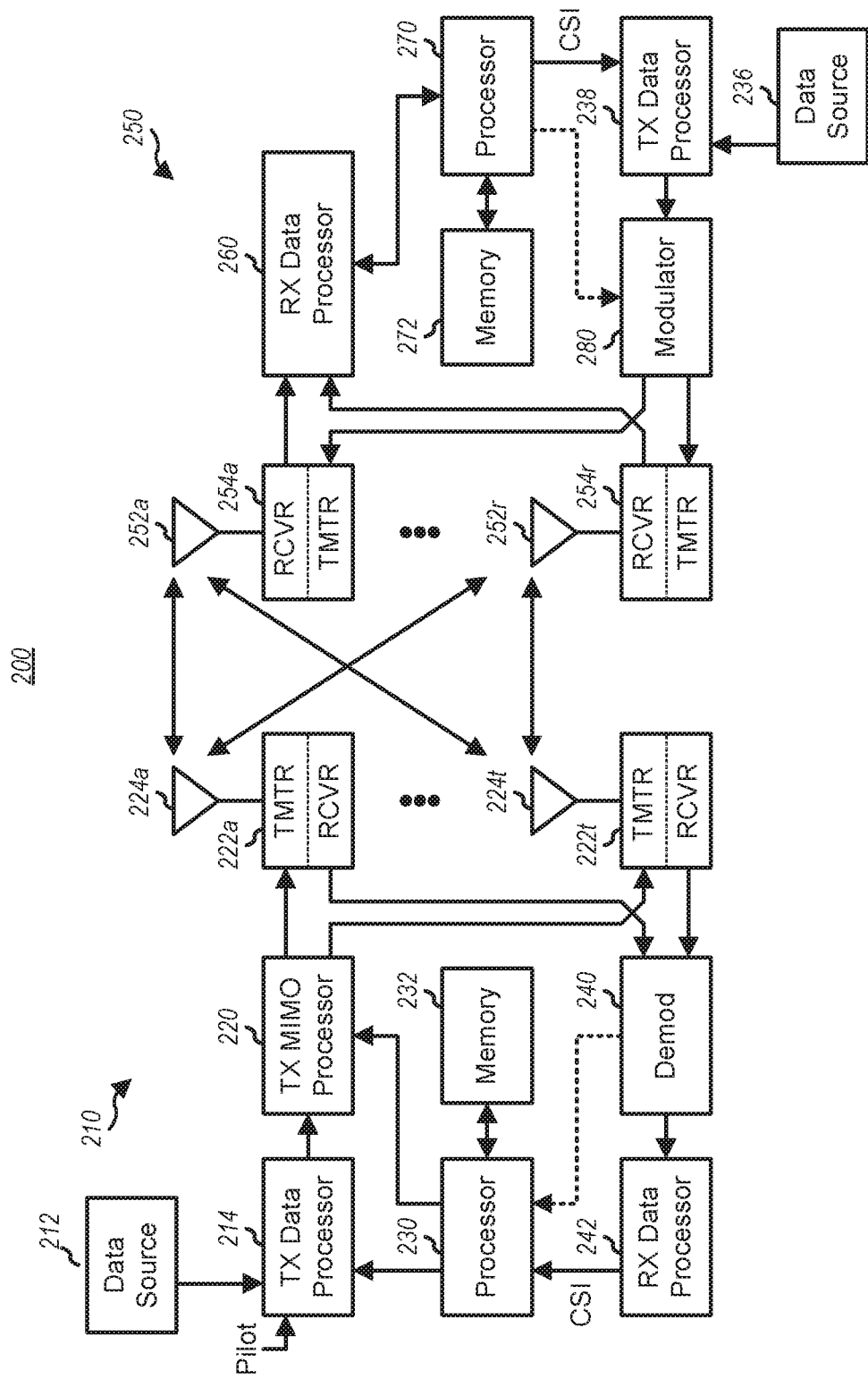
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
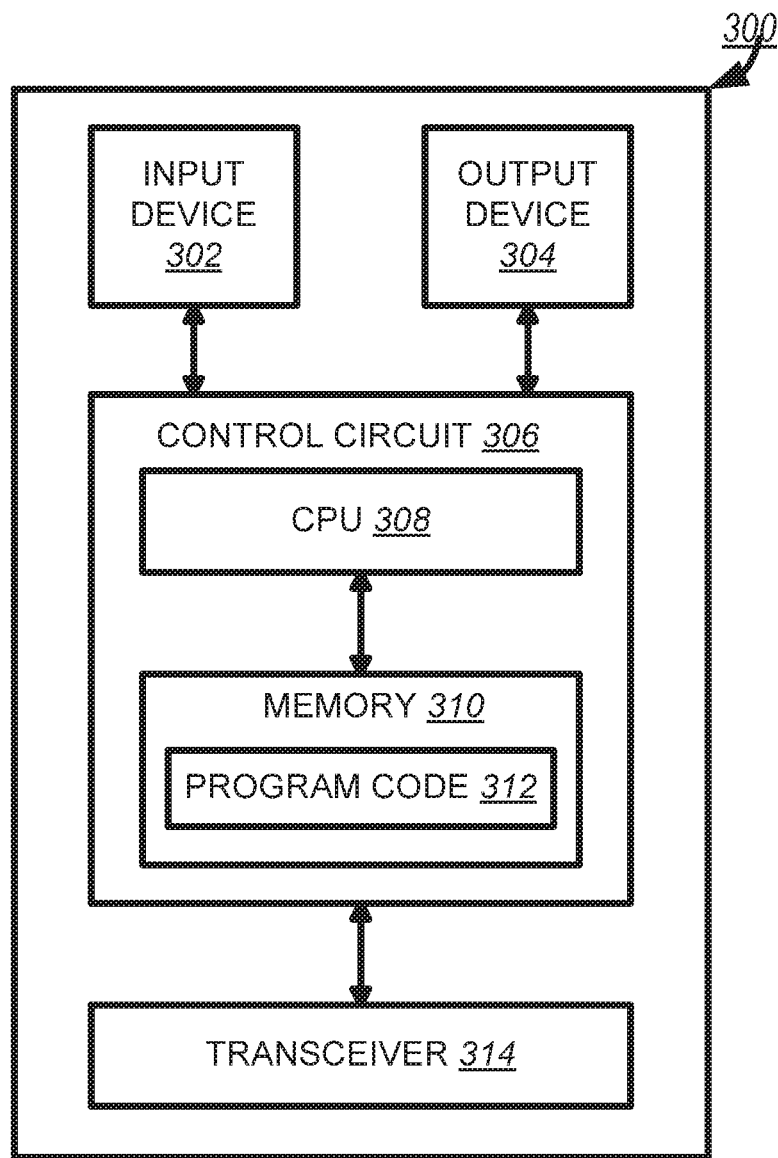
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
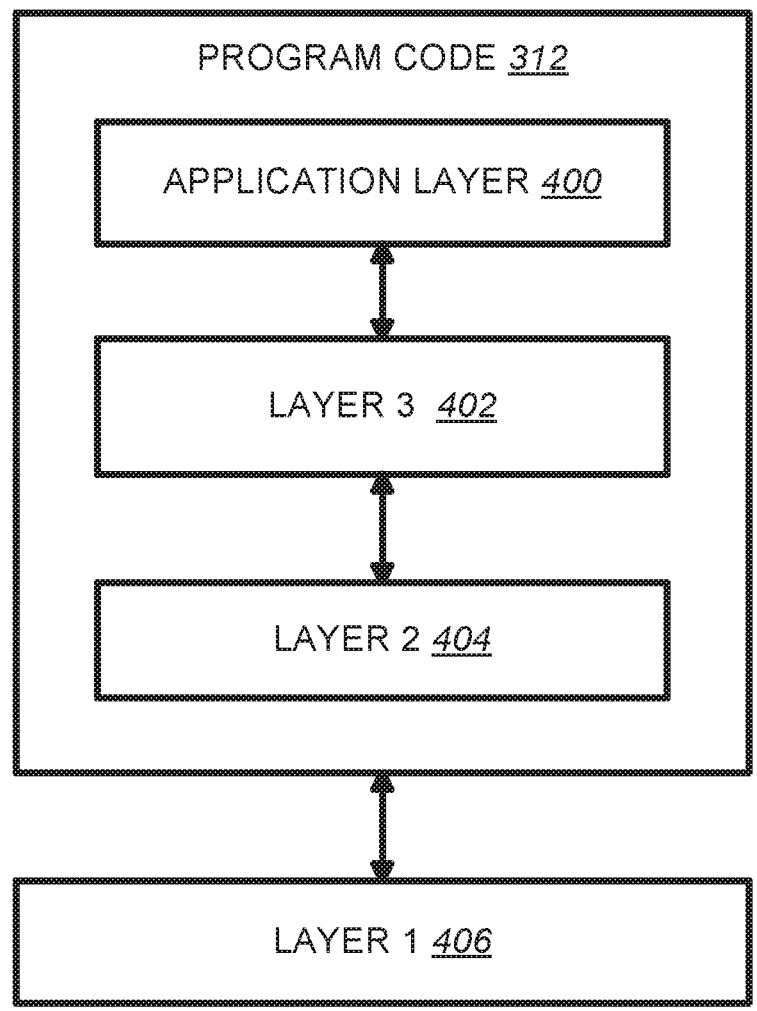
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

The DOCOMO 5G White Paper discusses the concept of radio access for 5G. One key point is to efficiently integrate both lower and higher frequency bands. Higher frequency bands provide opportunities for wider spectrum but have coverage limitations because of higher path loss. The DOCOMO 5G White Paper proposes that 5G system has a two-layer structure that consists of a coverage layer (e.g., consisting of macro cell(s)) and a capacity layer (e.g., consisting of small cell(s) or phantom cell(s)). The coverage layer generally uses existing lower frequency bands to provide basic coverage and mobility. The capacity layer generally uses new higher frequency bands to provide high data rate transmission. The coverage layer could be supported by enhanced LTE (Long Term Evolution) RAT (Radio Access Technology) while the capacity layer could be supported by a new RAT dedicated to higher frequency bands. The efficient integration of the coverage and capacity layers is enabled by the tight interworking (or dual connectivity) between the enhanced LTE RAT and the new RAT.

As discussed in 3GPP R2-145410, dual connectivity is generally a mode of operation of a UE in RRC_CONNECTED, configured with a Master Cell Group (i.e., a group of serving cells associated with the MeNB (Master evolved Node B), comprising of the PCell (Primary Cell) and optionally one or more SCells (Secondary Cells)) and a Secondary Cell Group (i.e., a group of serving cells associated with the SeNB (Secondary evolved Node B), comprising of PSCell (Primary SCell) and optionally one or more SCells). A UE configured with dual connectivity means that the UE is configured to utilize radio resources provided by two distinct schedulers, located in two eNBs (MeNB and SeNB) connected via a non-ideal backhaul over the X2 interface. Further details of dual connectivity can be found in 3GPP R2-145410.

In dual connectivity, the random access procedure is performed at least on the PSCell upon SCG (Secondary Cell Group) addition or modification (if instructed), upon DL (Downlink) data arrival during RRC_CONNECTED requiring random access procedure (e.g., when UL (Uplink) synchronization status is non-synchronized), or upon UL data arrival during RRC_CONNECTED requiring random access procedure (e.g., when UL synchronization status is non-synchronized or when there is no available PUCCH (Physical Uplink Control Channel) resources for SR (Scheduling Request)). The UE initiated random access procedure is performed only on PSCell for SCG.

Figure 5:
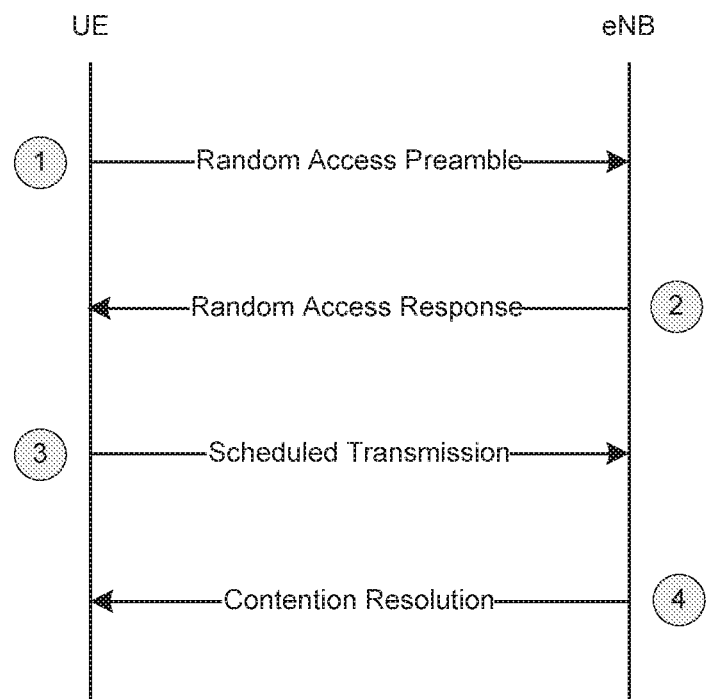
FIG. 5 illustrates a contention-based Random Access procedure.

The random access procedure has two different types: contention-based and non-contention based. FIG. 5 shows the contention based random access procedure, which includes the following four steps:
1. Random Access Preamble on RACH (Random Access Channel) mapped to PRACH (Physical Random Access Channel) in uplink;
2. Random Access Response generated by MAC (Medium Access Control) on DL-SCH (Downlink Shared Channel);
3. First scheduled UL transmission on UL-SCH (Uplink Shared Channel); and
4. Contention Resolution on DL.

Figure 6:
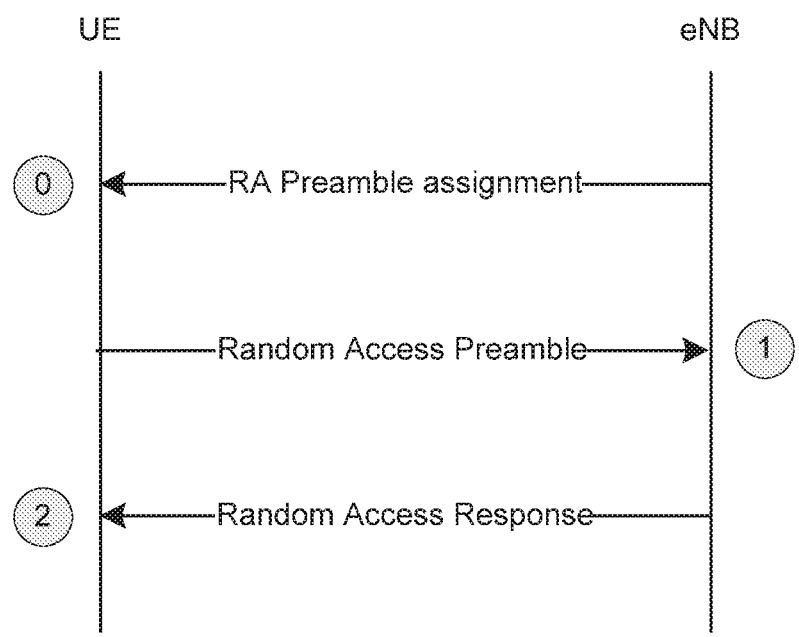
FIG. 6 illustrates a contention-free Random Access procedure.

FIG. 6 shows the non-contention based random access procedure, which includes the three following steps:

1. Dedicated Random Access Preamble assignment via dedicated signalling in DL;
2. Non-contention Random Access Preamble on RACH mapped to PRACH in uplink; and
3. Random Access Response on DL-SCH.

Details of each step in a random access procedure can be found in 3GPP R2-145410 and TS 36.321 V12.3.0.

In addition, the UE can initiate a Scheduling Request (as discussed in 3GPP TS 36.321 V12.3.0) in PSCell to request UL resource (e.g., UL grant, from SeNB). Furthermore, the UE can be configured to perform DRX (Discontinuous Reception) functionality for SCG. The DRX functionality is used to control PDCCH (Physical Downlink Control Channel) monitoring activity of the UE (e.g., if DRX functionality is configured, the UE is allowed to monitor PDCCH discontinuously based on DRX operation). In detail, the UE should monitor PDCCH during the Active Time, for a PDCCH-subframe (as discussed in 3GPP TS 36.321 V12.3.0):

The Active Time includes the time while:
onDurationTimer or drx-InactivityTimer or drx-RetransmissionTimer or mac-ContentionResolutionTimer is running; or
a Scheduling Request is sent on PUCCH (Physical Uplink Control Channel) and is pending; or
an uplink grant for a pending HARQ (Hybrid Automatic Repeat reQuest) retransmission can occur and there is data in the corresponding HARQ buffer; or
a PDCCH indicating a new transmission addressed to the C-RNTI (Cell Radio Network Temporary Identifier) for SCG has not been received after successful reception of a Random Access Response for the preamble not selected by UE.

PDCCH-subframe refers to a subframe with PDCCH. For SCG configured with only FDD (Frequency Division Duplex) serving cell(s), this represents any subframe; for SCG configured with at least one TDD (Time Division Duplex) serving cell, if UE is capable of simultaneous reception and transmission in the aggregated cells, this represents the union of downlink subframes and subframes including DwPTS (Downlink Pilot Time Slot) of all serving cells, except serving cells that are configured with schedulingCellId (as discussed in 3GPP TS 36.212 V12.2.0); otherwise, this represents the subframes where the PSCell is configured as a downlink subframe or a subframe including DwPTS.

Furthermore, the power control of random access procedure is properly defined to improve the robustness and efficiency (as discussed in 3GPP TS 36.213 V12.3.0). The power of preamble would be increased from attempt to attempt, also known as power ramping, if the preamble attempts have not yet succeeded. And once a preamble attempt succeeds, the power level of that preamble attempt would be used to derive the power of the following uplink transmission, e.g., PUSCH (Physical Uplink Shared Channel), PUCCH or reference signals. More details on this aspect can be found in 3GPP TS 36.213 V12.3.0.

Cells on the capacity layer may use beam forming. Beam forming is generally a signal processing technique used in antenna arrays for directional signal transmission or reception. This is achieved by combining elements in a phased array in such a way that signals at particular angles experience constructive interference while others experience destructive interference. Beam forming can be used at both the transmitting and receiving ends in order to achieve spatial selectivity. The improvement compared with omni-directional reception/transmission is known as the receive/transmit gain.

Beam forming is frequently applied in radar systems. The beam created by a phased array radar is comparatively narrow and highly agile compared to a moving dish. This characteristic gives the radar the ability to detect small, fast targets like ballistic missiles in addition to aircrafts.

The benefit of co-channel interference reduction also makes beam forming attractive to a mobile communication system designer. U.S. Patent Publication No. 2010/0165914 generally discloses the concept of beam division multiple access (BDMA) based on beam forming technique. In BDMA, a base station can communicate with a mobile device via a narrow beam to obtain the receive/transmit gain. Furthermore, two mobile devices in different beams can share the same radio resources at the same time; and thus the capacity of a mobile communication system can increase greatly. To achieve that, the base station should know in which beam a mobile device is located.

As discussed above, a cell on the capacity layer may use beam forming for directional signal transmission or reception. Due to power saving or hardware limitation (e.g., insufficient number of transceivers), the cell may not be able to generate all the beams to cover all directions within the coverage of the cell. In other words, the cell may generate part of the beams for directional signal transmission or reception at a time. At the same time, directional signal transmission or reception for other non-generated beams would be impossible.

Then, if a UE, at a location only covered by non-generated beams, transmits any UL signaling (e.g., a Random Access Preamble for a Random Access procedure), the base station controlling the cell will not be able to receive the UL signaling (e.g., Random Access Preamble will not be received and the Random Access procedure will not succeed). Similarly, the UE cannot receive any DL signaling at the time that no beam covering the location of the UE is generated. The UE would just waste its power for transmission or reception. And signaling may be missing. Therefore, a method to prevent unnecessary UE power consumption and the missing signaling should be considered.

Currently, network configures a UE with available PRACH resource for Random Access Preamble transmission. For example, as discussed in 3GPP TS 36.331 V12.3.0 and in Section 5.7 of 3GPP TS 36.211 V12.3.0, prach-ConfigIndex is used to configure a PRACH period (or a Random Access Preamble period) and a number of PRACH opportunities (or a Random Access Preamble opportunities) within one PRACH period. In addition, network may configure a PRACH mask (e.g., ra-PRACH-MaskIndex as discussed in 3GPP TS 36.321 V12.3.0 and TS 36.331 V12.3.0) to the UE associated with a dedicated Random Access Preamble assigned to the UE to restrict the UE's PRACH opportunities.

In one embodiment, the general concept of invention is that a UE decides whether to transmit a Random Access Preamble at a specific timing (or at a PRACH opportunity) in a cell based on at least beam(s) (or beam group(s)) of the cell detected by the UE.

More specifically, the UE makes the decision also based on one or more of the following information:

Information related to a mapping between a PRACH opportunity of the cell and the beam(s) (or beam group(s)) of the cell, e.g., which beam(s) will be generated at the PRACH opportunity to receive a Random Access Preamble;

Information for more than one PRACH opportunity configurations for the cell (e.g., more than one prach-ConfigIndex for the cell) configured to the UE. Each PRACH opportunity configuration is associated with at least one beam. Different PRACH opportunity configurations are associated with different beam(s) (or beam group(s)) of the cell. The UE selects one of the more than one PRACH opportunity configurations to apply based on at least the beam(s) (or beam group(s)) of the cell detected by the UE; and/or Information for more than one PRACH masks for the cell (e.g., more than one ra-PRACH-MaskIndex for the cell) configured to the UE. Each PRACH mask is associated with at least one beam. Different PRACH masks are associated with different beam(s) (or beam group(s)) of the cell. And the UE selects one of the more than one PRACH masks to apply based on at least the beam(s) (or beam group(s)) of the cell detected by the UE.

The above information could be provided from a base station to the UE.

From the perspective of a UE, the UE initiates a Random Access procedure in a serving cell. Then, the UE decides whether to transmit a Random Access Preamble in the serving cell at a specific timing during the Random Access procedure based on at least one information including beam(s) (or beam group(s)) of the serving cell detected by the UE.

From the perspective of a base station, the base station provides at least one information to a UE for the UE to select a specific timing during a Random Access procedure for transmission of a Random Access Preamble in a serving cell, wherein the at least one information is related to beam(s) (or beam group(s)) of the serving cell detected by the UE.

The at least one information includes a relation between a Preamble transmission opportunity in the serving cell and beam(s) (or beam group(s)) of the serving cell.

Furthermore, the UE skips a PRACH opportunity if beam(s) (or beam group(s)) associated with the PRACH opportunity is not detected by the UE. Alternatively, the UE does not transmit the Random Access Preamble at the specific timing if (all) beam(s) (or beam group(s)) associated with the specific timing is not detected by the UE. More specifically, the UE uses a PRACH opportunity if beam(s) (or beam group(s)) associated with the PRACH opportunity is detected by the UE. Alternatively, the UE transmits the Random Access Preamble at the specific timing at least if (any) beam(s) (or beam group(s)) associated with the specific timing is detected by the UE.

Furthermore, the UE decides whether the specific timing is a valid PRACH opportunity based on at least PRACH opportunity configuration selected by the UE. Alternatively, the UE decides whether the specific timing is a valid PRACH opportunity based on at least PRACH mask selected by the UE.

In another embodiment, after a Random Access procedure is complete, the base station may be still not completely know about which beam(s) the UE is located in. In order to acquire complete information, the base station may trigger the UE to send an aperiodic reference signal (e.g., aperiodic SRS or type 1 SRS as discussed in 3GPP TS 36.213 V12.3.0) transmission in the cell after a Random Access procedure associated to the Random Access Preamble is complete. Alternatively, the base station may (explicitly or implicitly) trigger the UE to transmit the aperiodic reference signal by a PDCCH signaling used to indicate a Random Access Response or by a PDCCH signaling used for Contention Resolution.

Furthermore, if the Random Access Preamble is non-contention based, the Random Access procedure is complete when the base station transmits a Random Access Response to the UE. Alternatively, if the Random Access Preamble is contention-based, the Random Access procedure is complete when the base station transmits a PDCCH signaling used for Contention Resolution to the UE.

Furthermore, an indication to trigger the aperiodic reference signal transmission may be included in the PDCCH signaling. Alternatively, the indication may be included in the Random Access Response.

When the aperiodic reference signal transmission is triggered, the UE decides whether to transmit the aperiodic reference signal at a specific timing in the cell based on at least beam(s) (or beam group(s)) of the cell detected by the UE.

From the perspective of a UE, the UE receives a DL signaling to trigger a transmission of an aperiodic reference signal in a serving cell. The UE decides whether to transmit the aperiodic reference signal in the serving cell at a specific timing based on at least one information including beam(s) (or beam group(s)) of the serving cell detected by the UE. The DL signaling could be a PDCCH signaling.

The at least one information includes a relation between an aperiodic reference signal transmission opportunity in the serving cell and beam(s) (or beam group(s)) of the serving cell and/or more than one aperiodic reference signal transmission opportunity configurations for the serving cell. The UE applies at least one of the more than one aperiodic reference signal transmission opportunity configurations at least based on the beam(s) (or beam group(s)) of the serving cell detected by the UE.

In above embodiments, the UE does not transmit the aperiodic reference signal at the specific timing if (all) beam(s) (or beam group(s)) associated with the specific timing is not detected by the UE. The UE transmits the aperiodic reference signal at the specific timing at least if (any) beam(s) (or beam group(s)) associated with the specific timing is detected by the UE.

In above embodiments, beam(s) (or beam group(s)) of the cell detected by the UE could mean that radio condition of the beam(s) (or beam group(s)) detected by the UE is higher than a threshold. Alternatively, detecting a beam (or a beam group) means that power of a DL reference signal associated with the beam (or the beam group), received by the UE, is larger than a threshold. Alternatively, transmission timing of a DL reference signal associated with a beam (or a beam group) can be used by the UE to identify or detect the beam (or the beam group), e.g., derive an identification of the beam (or the beam group). Alternatively, transmission resource of a DL reference signal associated with a beam (or a beam group) can be used by the UE to identify or detect the beam (or the beam group), e.g., derive an identification of the beam (or the beam group).

In above embodiments, the information is transmitted from the base station to the UE. Alternatively, the information is transmitted from the base station to another base station. Then, the another base station forwards the information to the UE.

In an alternative embodiment, a first base station (e.g., SeNB) controlling a cell could provide a PRACH opportunity configuration for the cell to a UE first. The first base station would transmit a signal (e.g., MAC Control Element or PDCCH signaling) in at least one beam of the cell to the UE to indicate which PRACH opportunity in the PRACH opportunity configuration is valid. Alternatively, the transmitted signal could indicate which PRACH opportunity in the PRACH opportunity configuration is not valid. Valid (or not valid) PRACH opportunity indicated by the transmitted signal may be different based on in which beam the signal is transmitted.

Alternatively, the first base station could also provide more than one PRACH opportunity configurations for the cell to the UE first. The first base station would transmit a signal (e.g., MAC Control Element or PDCCH signaling) in at least one beam of the cell to the UE to indicate which PRACH opportunity configuration should be used by the UE.

The transmitted signal may be different based on in which beam the signal is transmitted. Content of the signal (e.g., which Preamble transmission opportunity can be used) is at least based on in which beam(s) the signal is transmitted. Furthermore, the transmitted signal could be carried by a dedicated signaling to the UE. Alternatively, the transmitted signal could be broadcasted in the beam. More specifically, the signal indicates a PRACH mask. Or the signal is related to a Preamble transmission mask configuration.

Then the UE can decide whether to transmit a Random Access Preamble at a specific timing based on at least the PRACH opportunity configuration and the signal.

Furthermore, the PRACH opportunity configuration is sent from the first base station to a second base station, e.g., MeNB, and the second base station forwards the PRACH opportunity configuration to the UE.

From the perspective of a base station, the base station provides a Preamble transmission opportunity configuration for a serving cell controlled by the base station to a UE. The base station transmits a signal in at least one beam of the serving cell to the UE, wherein the signal is related to whether a Preamble transmission opportunity indicated by the Preamble transmission opportunity configuration can be used to transmit a Random Access Preamble in the serving cell or not. And the Preamble transmission opportunity configuration is not provided together with the signal.

From the perspective of a UE, the UE receives a Preamble transmission opportunity configuration for a serving cell controlled by the base station. The UE receives a signal related to whether a Preamble transmission opportunity indicated by the Preamble transmission opportunity configuration can be used to transmit a Random Access Preamble in the serving cell or not, wherein the Preamble transmission opportunity configuration is not received together with the signal. And the UE decides whether to transmit a Random Access Preamble in the serving cell at a specific timing during a Random Access procedure at least based on the Preamble transmission opportunity and the signal.

The Preamble transmission opportunity configuration is transmitted from the base station to the UE. Alternatively, the Preamble transmission opportunity configuration is transmitted from the base station to another base station. And the another base station forward the Preamble transmission configuration to the UE.

In above embodiments, the PRACH opportunity configuration includes a PRACH period, number of PRACH opportunities within one PRACH period, and/or location of PRACH opportunities within one PRACH period. The Preamble transmission opportunity configuration includes a Preamble transmission period (e.g., PRACH period), a number of Preamble transmission opportunities within one Preamble transmission period, and/or (time domain) location of Preamble transmission opportunities within one Preamble transmission period. The UE receives a Preamble transmission opportunity configuration, e.g., prach-ConfigIndex, for the serving cell before initiating the Random Access procedure.

In above embodiments, the PRACH mask is used to prohibit some PRACH opportunities indicated by a PRACH opportunity configuration. The Preamble transmission mask configuration is used to prohibit some Preamble transmission opportunities indicated by a Preamble transmission opportunity configuration.

In above embodiments, the Random Access Preamble is selected by the UE, e.g., contention-based Random Access Preamble. Alternatively, the Random Access Preamble is provided by the base station, e.g., dedicated Random Access Preamble.

In above embodiments, the specific timing is derived at least based on the Preamble transmission opportunity configuration and/or the Preamble transmission mask configuration.

In above embodiments, the UE connects to a plurality of serving cells. The plurality of serving cells are controlled by different base stations. The serving cell is controlled by a base station, e.g., SeNB, which does not control PCell.

Figure 7:
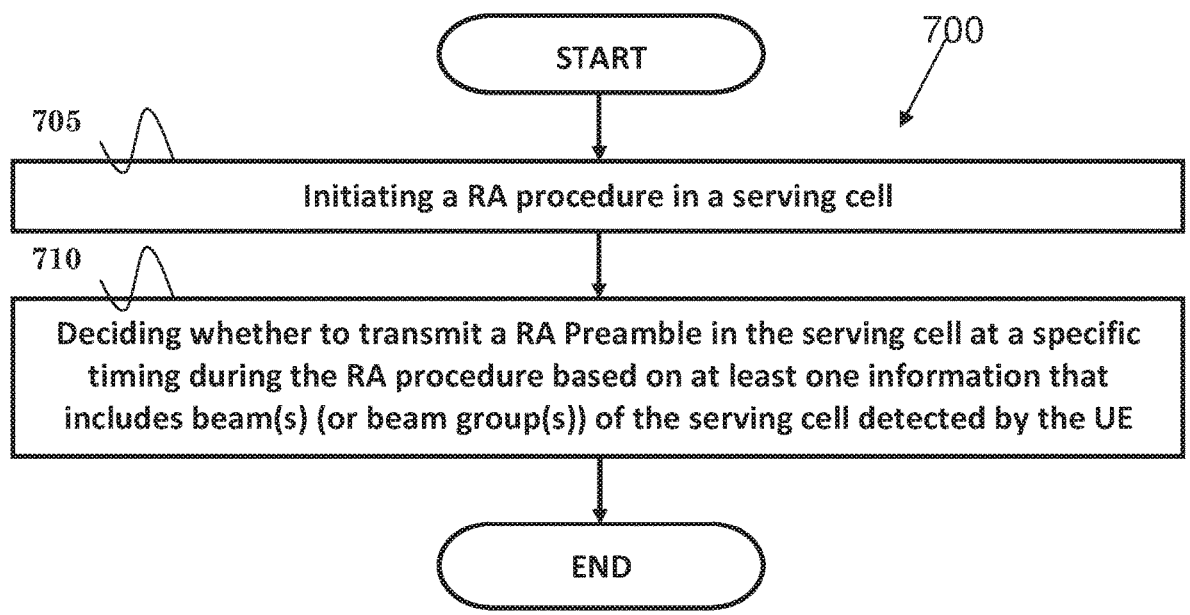
FIG. 7 is a flow chart according to one exemplary embodiment.

FIG. 7 is a flow chart 700, from the perspective of a UE, in accordance with one exemplary embodiment. In step 705, the UE initiates a Random Access (RA) procedure in a serving cell. In step 710, the UE decides whether to transmit a RA Preamble in the serving cell at a specific timing during the RA procedure based on at least one information that includes beam(s) (or beam group(s)) of the serving cell detected by the UE. In one embodiment, the at least one information further includes a relation between a Preamble transmission opportunity in the serving cell and beam(s) (or beam group(s)) of the serving cell.

In one embodiment, the beam(s) (or beam group(s)) detected by the UE could mean that radio condition (such as a RSRP (Reference Signal Received Power) or a RSRQ (Reference Signal Received Quality)) of the beam(s) (or beam group(s)) is higher than a threshold. Furthermore, detecting a beam (or a beam group) could mean that power of a DL (Downlink) reference signal associated with the beam (or the beam group), received by the UE, is larger than a threshold.

The UE could use a transmission timing of a DL (Downlink) reference signal associated with a beam (or a beam group) to identify or detect the beam (or the beam group). Alternatively, the UE could use a transmission resource of a DL reference signal associated with a beam (or a beam group) to identify or detect the beam (or the beam group). In general, identify or detecting the beam (or the beam group) means deriving an identification of the beam (or the beam group).

Referring back to FIGS. 3 and 4, in one embodiment from the perspective of a UE, the device 300 includes a program code 312 stored in the memory 310. The CPU 308 could execute program code 312 (i) to initiate a Random Access (RA) procedure in a serving cell, and (ii) to decide whether to transmit a RA Preamble in the serving cell at a specific timing during the RA procedure based on at least one information that includes beam(s) (or beam group(s)) of the serving cell detected by the UE. Furthermore, the CPU 308 can execute the program code 312 to perform all of the above-described actions and steps or others described herein.

Figure 14:
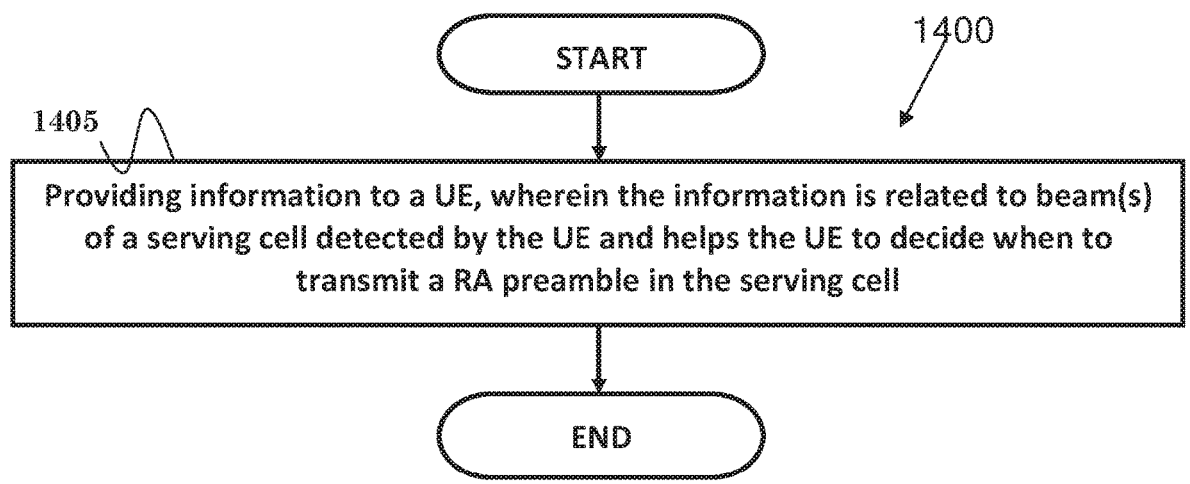
FIG. 14 is a flow chart according to one exemplary embodiment.

Turning to FIG. 14, this figure is a flow chart 1400 in accordance with one exemplary embodiment. In step 1405, information is provided to the UE, wherein the information is related to beam(s) of a serving cell detected by the UE and helps the UE to decide when to transmit a RA preamble in the serving cell.

Referring back to FIGS. 3 and 4, in one embodiment, the device 300 includes a program code 312 stored in the memory 310. The CPU 308 could execute program code 312 to provide information to the UE, wherein the information is related to beam(s) of a serving cell detected by the UE and helps the UE to decide when to transmit a RA preamble in the serving cell. Furthermore, the CPU 308 can execute the program code 312 to perform all of the above-described actions and steps or others described herein.

Figure 15:
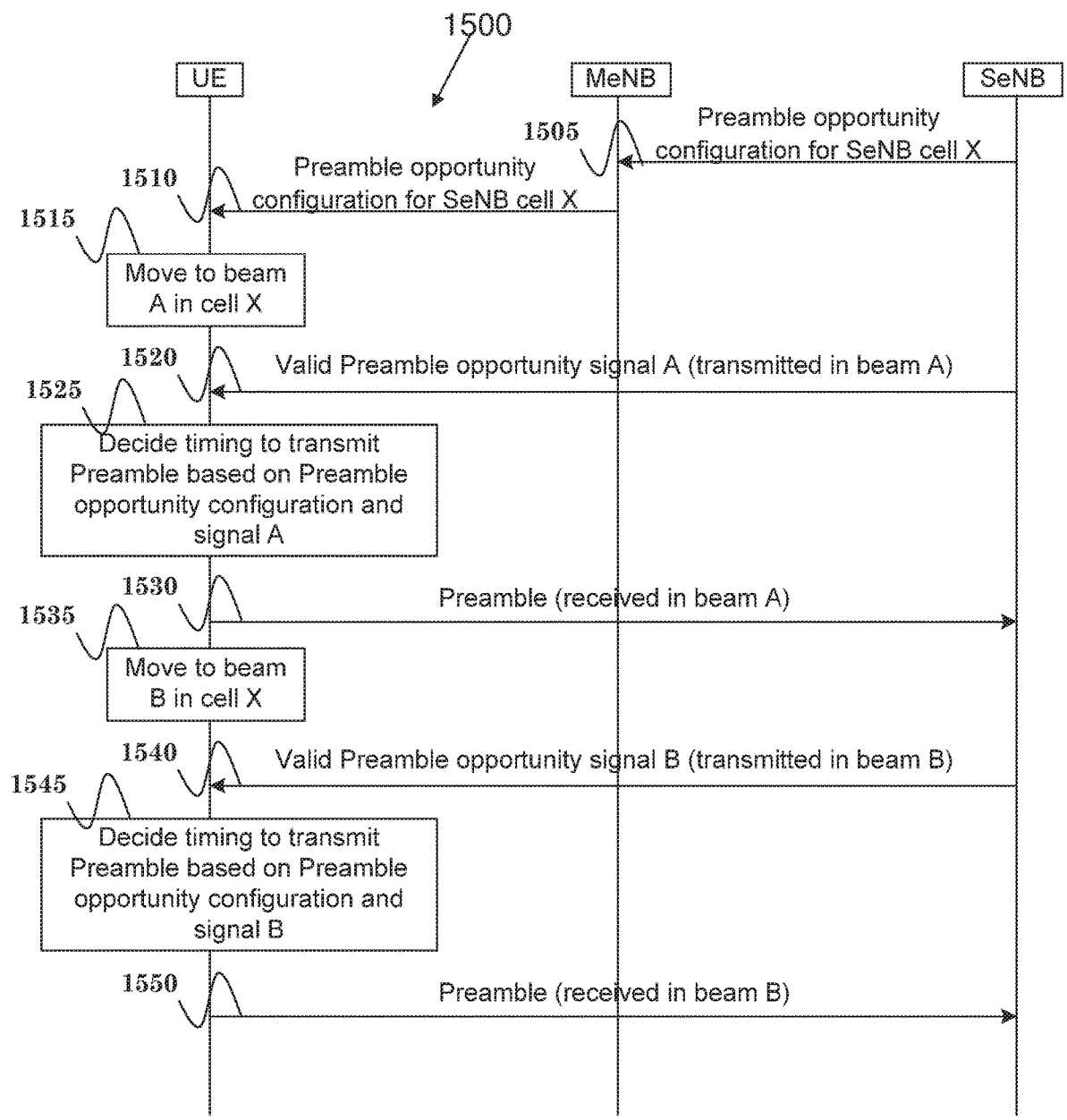
FIG. 15 is a message chart according to one exemplary embodiment.

FIG. 15 is a flow chart 1500 in accordance with one exemplary embodiment. In step 1505, SeNB notifies MeNB that there is a preamble opportunity configuration for SeNB cell X. In step 1510, MeNB notifies UE that there is a preamble opportunity configuration for SeNB cell X. In step 1515, UE moves to beam A in cell X. In step 1520, SeNB notifies UE of a valid preamble opportunity via signal A (which was transmitted in beam A). In step 1525, UE decides the timing to transmit the Preamble based on the Preamble opportunity configuration and signal A. In step 1530, UE transmits the Preamble in cell X, and SeNB receives the Preamble in beam A of cell X. In step 1535, UE moves to beam B in cell X. In step 1540, SeNB notifies UE of a valid preamble opportunity via signal B (which was transmitted in beam B). In step 1545, UE decides the timing to transmit the Preamble based on the Preamble opportunity configuration and signal B. In step 1550, UE transmits the Preamble in cell X, and SeNB receives the Preamble in beam B of cell X.

Figure 16:
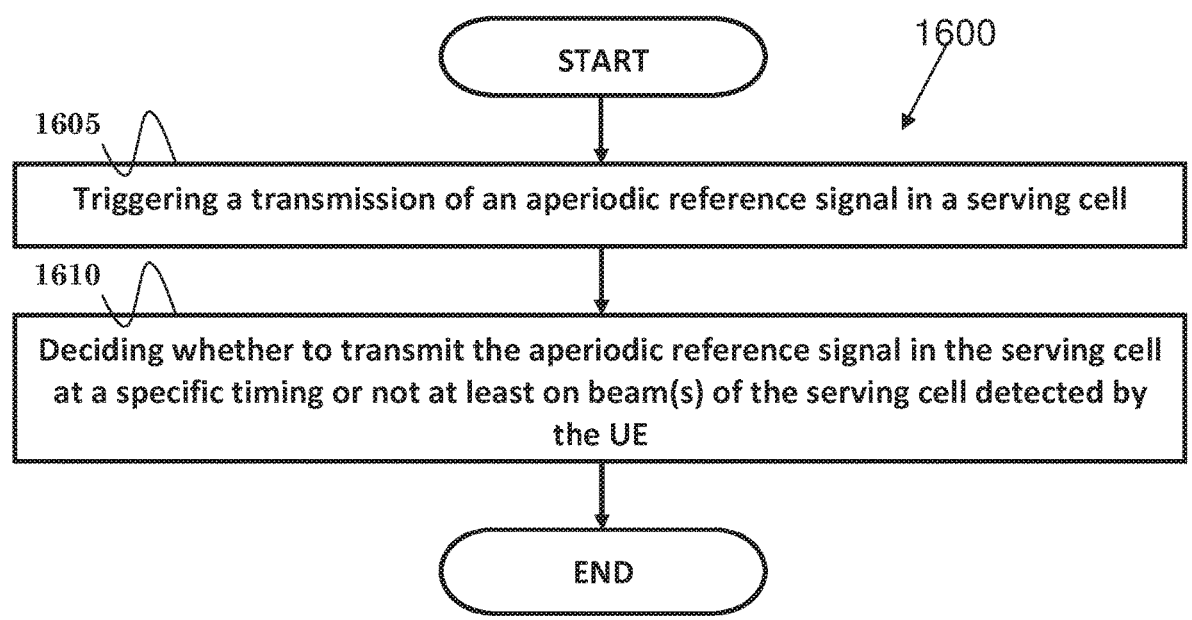
FIG. 16 is a flow chart according to one exemplary embodiment.

FIG. 16 is a flow chart 1600 in accordance with one exemplary embodiment. Step 1605 involves the triggering of a transmission of an aperiodic reference signal in a serving cell. Step 1610 involves deciding whether to transmit the aperiodic reference signal in the serving cell at a specific timing or not at least on beam(s) of the serving cell detected by the UE.

Referring back to FIGS. 3 and 4, in one embodiment, the device 300 includes a program code 312 stored in the memory 310. The CPU 308 could execute program code 312 (i) to trigger of a transmission of an aperiodic reference signal in a serving cell, and (ii) to decide whether to transmit the aperiodic reference signal in the serving cell at a specific timing or not at least on beam(s) of the serving cell detected by the UE. Furthermore, the CPU 308 can execute the program code 312 to perform all of the above-described actions and steps or others described herein.

In one embodiment, the general concept of invention is that a base station controlling a cell would provide information to a UE, wherein the information is related to when a beam (or a beam group) of the cell will be generated. Then the UE can use the information to decide whether to perform a transmission or a reception in the cell.

More specifically, the information could include when the beam (or the beam group) will be generated during a time period. Alternatively, the information could include when is the next time that the beam (or the beam group) will be generated.

The information is provided before the time period. Alternatively, the information is provided in the beginning of the time period. The length of the time period is configurable and provided from the base station to the UE. When the beam (or beam group) will be generated can be indicated by a bitmap, e.g., 1 could mean generated and 0 could mean not generated. Also, the information could be provided in the beam (or the beam group). The information is provided periodically. Alternatively, the information is provided in each transmission of a DL control signaling in the beam (or the beam group). Alternatively, the information is provided in each transmission of a DL data in the beam (or the beam group).

Furthermore, the information could be broadcasted. Alternatively, the information could be provided by a dedicated signaling. The information could be carried by a DL control signaling, a MAC Control element (discussed in 3GPP TS 36.321 V12.3.0), a PDCCH signaling (discussed in Section 5.3.3 of 3GPP TS 36.212 V12.2.0), or a physical layer control signaling.

In addition, the base station provides the information and a second information that is related to when another beam (or beam group) of the cell will be generated, in the same subframe or in the same TTI (Transmission Time Interval). Alternatively, the information includes the second information that is related to when another beam (or beam group) of the cell will be generated.

From the perspective of a base station, the base station provides information associated with a cell controlled by the base station to a UE, wherein the information is related to when a beam (or a beam group) of the cell will be generated. If the beam (or the beam group) is generated, the base station can perform transmission in the cell to UE(s) in coverage of the beam (or the beam group). Furthermore, if the beam (or the beam group) is generated, the base station can receive transmission in the cell from UE(s) in coverage of the beam (or the beam group).

On the other hand, if the beam (or the beam group) is not generated, the base station cannot perform transmission in the cell to UE(s) only in coverage of the beam (or the beam group). In addition, if the beam (or the beam group) is not generated, the base station cannot receive transmission in the cell from UE(s) only in coverage of the beam (or the beam group).

From the perspective of a UE, the UE receives information associated with a cell controlled by a base station, wherein the information is related to when a beam (or a beam group) of the cell will be generated. The UE determines whether to perform a reception in the cell based on at least the information. More specifically, the UE does not perform the reception if the beam (or the beam group) is not generated. In one embodiment, the UE determines whether to perform the reception in the cell also based on a configuration associated with the reception. The configuration could include a reception window for the Random Access Response associated with the cell, e.g., ra-ResponseWindowSize as discussed in 3GPP TS 36.321 V12.3.0 and TS 36.331 V12.3.0. If the beam (or the beam group) is generated and the UE is in coverage of the beam (or the beam group), the UE can receive DL transmission in the cell. If the beam (or the beam group) is not generated and the UE is only in coverage of the beam (or the beam group), the UE cannot receive DL transmission in the cell.

From the perspective of a UE, the UE receives information associated with a cell controlled by a base station, wherein the information is related to when a beam (or a beam group) of the cell will be generated. The UE determines whether to perform a transmission in the cell based on at least the information. More specifically, the UE does not perform the transmission if the beam (or the beam group) is not generated. In one embodiment, the UE determines whether to perform the transmission in the cell also based on a configuration associated with the transmission. The configuration could include SRS configuration associated with the cell, e.g., periodicity.

For DL reception, if the UE has the information, the UE could:

determine when to receive a Random Access Response in the cell based on at least the information;

determine when to monitor a DL control signaling, e.g., PDCCH signaling, in the cell based on at least the information;

determine whether to consider a subframe as a PDCCH-subframe based on at least the information;

determine whether to consider a subframe belonging to Active Time based on at least the information; and/or determine when to receive (or measure) a DL reference signal, e.g., cell-specific reference signal as discussed in 3GPP TS 36.211 V12.3.0, in the cell based on at least the information.

For UL transmission, if the UE has the information, the UE could:

determine when to transmit a Random Access Preamble in the cell;

determine when to transmit a UL reference signal, e.g., SRS as discussed in 3GPP TS 35.213 V12.3.0, in the cell based on at least the information;

determine when to transmit a Scheduling Request in the cell based on at least the information;

determine when to transmit a DL channel condition report, e.g., periodic or aperiodic CSI report as discussed in 3GPP TS 35.213 V12.3.0, in the cell based on at least the information;

determine when to transmit an UL transmission in the cell based on at least the information, wherein the UL transmission is associated with an UL grant received from the base station; and/or determine when to transmit a HARQ feedback in the cell based on at least the information, wherein the HARQ feedback is associated with a DL transmission received from the base station.

Also, the UE makes the determination based on related configuration for the beam or the cell. The related configuration includes at least one of the following configurations:

Random Access Preamble transmission opportunity, e.g., prach-ConfigIndex as discussed in 3GPP TS 36.331 V12.3.0 and in Section 5.7 of 3GPP TS 36.211 V12.3.0;

DRX related configuration as discussed in 3GPP TS 36.321 V12.3.0 and TS 36.331 V12.3.0, e.g., DRX cycle length, DRX start offset, DRX timer length, or etc;

Measurement configuration as discussed in 3GPP TS 36.331 V12.3.0;

Scheduling Request opportunity as discussed in 3GPP TS 36.321 V12.3.0 and TS 36.331 V12.3.0;

CSI related configuration as discussed in 3GPP TS 36.331 V12.3.0, e.g., periodicity; and/or TDD UL/DL configuration as discussed in 3GPP TS 36.331 V12.3.0, e.g., TDD subframe configuration associated with the cell about whether a subframe is for DL or UL.

For example, if the configuration indicates that a subframe is not for the UE to perform the transmission or the reception in the cell, the UE does not perform the transmission or the reception in the subframe. If the configuration indicates that a subframe is for the UE to perform the transmission or the reception in the cell and the information indicates that at least one beam of the cell for the UE would be generated in the subframe, then the UE can perform the transmission or the reception in the subframe. If the configuration indicates that a subframe is for the UE to perform the transmission or the reception in the cell and the information indicates that no beam of the cell for the UE would be generated in the subframe, then the UE does not perform the transmission or the reception in the subframe.

Furthermore, the related configuration is received before receiving the information. The configuration is provided from the base station to the UE. Alternatively, the configuration could be provided from a second base station to the UE. The configuration is transmitted from the base station to the second base station. The second base station would then forward the configuration to the UE. In other words, the information is directly transmitted from the base station to the UE.

The related configuration and the information are received from different base stations, e.g., the related configuration from MeNB and the information from SeNB. The related configuration is cell specific. Alternatively, the related configuration could be beam specific or beam group specific.

In addition, if the information is not available for the UE, the UE would make the determination based on at least the related configuration but not the information.

Also, the UE is configured with dual connectivity to connect to the cell of the base station. The cell consists of more than one beams (or beam groups). The UE is in coverage of the beam (or the beam group). Within the cell, the UE is only in coverage of the beam (or the beam group). Alternatively, the UE is in coverage of more than one beam (or beam group) of the cell. The UE connects to more than one cells and/or more than one base stations.

Figure 8:
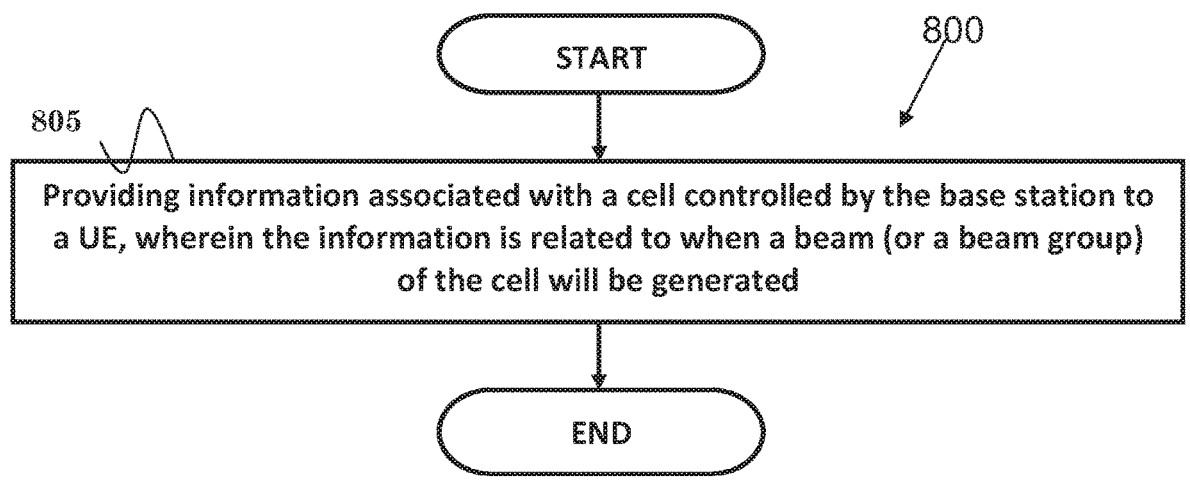
FIG. 8 is a flow chart according to one exemplary embodiment.

Turning to FIG. 8, this figure is a flow chart 800 from the perspective of a base station in accordance with one exemplary embodiment. In step 805, the base station provides information associated with a cell controlled by the base station to a UE, wherein the information is related to when a beam (or a beam group) of the cell will be generated. In one embodiment, the base station also provides a configuration associated with a transmission or reception in a cell to a UE.

Referring back to FIGS. 3 and 4, in one embodiment from the perspective of a base station, the device 300 includes a program code 312 stored in memory 310. The CPU 308 could execute program code 312 to provides information associated with a cell controlled by the base station to a UE, wherein the information is related to when a beam (or a beam group) of the cell will be generated. Furthermore, the CPU 308 can execute the program code 312 to perform all of the above-described actions and steps or others described herein.

Figure 9:
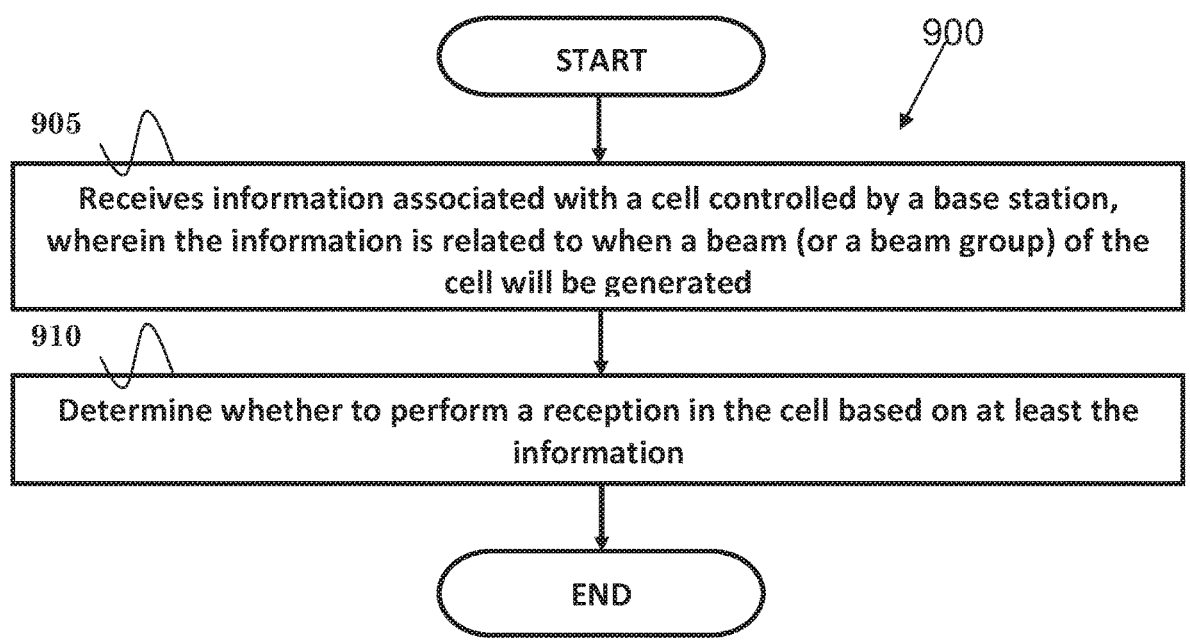
FIG. 9 is a flow chart according to one exemplary embodiment.

FIG. 9 is a flow chart 900, in accordance with one exemplary embodiment from the perspective of a UE. In step 905, the UE receives information associated with a cell controlled by a base station, wherein the information is related to when a beam (or a beam group) of the cell will be generated. In step 910, the UE determines whether to perform a reception in the cell based on at least the information. In one embodiment, the UE also receives a configuration associated with the reception in the cell. The UE could determine whether to perform the reception in the cell based further on the configuration associated with the reception.

Referring back to FIGS. 3 and 4, in one embodiment from the perspective of a UE, the device 300 includes a program code 312 stored in memory 310 of the transmitter. The CPU 308 could execute program code 312 (i) to receive information associated with a cell controlled by a base station, wherein the information is related to when a beam (or a beam group) of the cell will be generated, and (ii) to determine whether to perform a reception in the cell based on at least the information. In one embodiment, the CPU 308 could further execute program 312 to receive a configuration associated with the reception in the cell and determine whether to perform the reception in the cell based further on the configuration associated with the reception. In addition, the CPU 308 can execute the program code 312 to perform all of the above-described actions and steps or others described herein.

Figure 10:
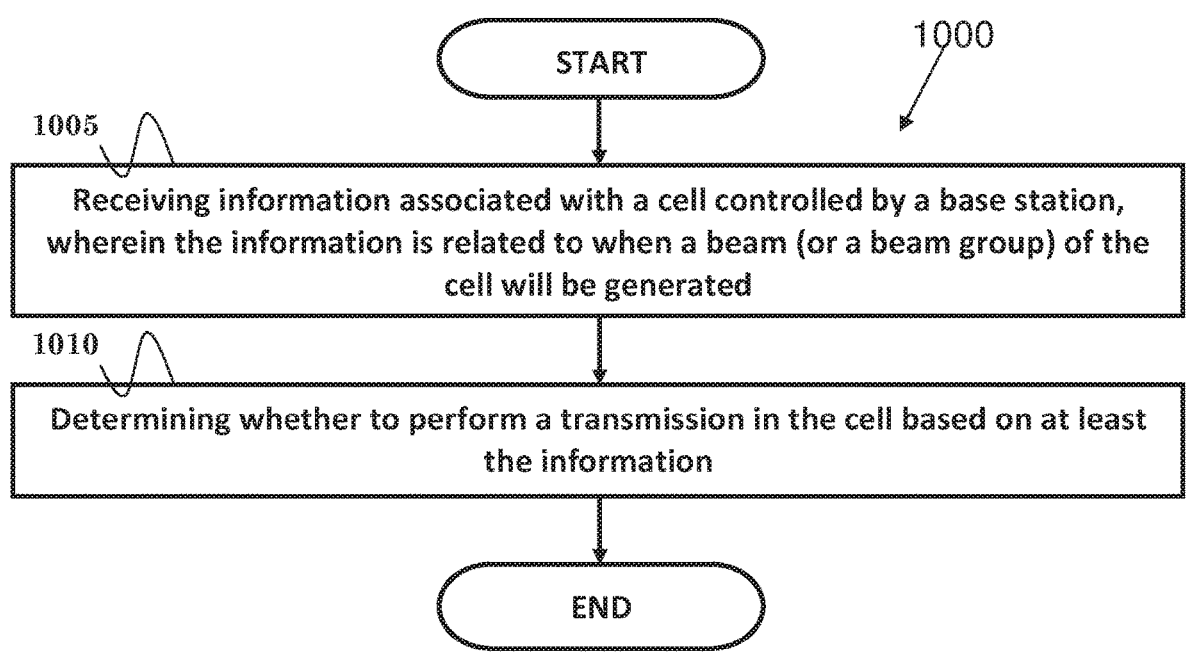
FIG. 10 is a flow chart according to one exemplary embodiment.

FIG. 10 is a flow chart 1000, in accordance with one exemplary embodiment from the perspective of a UE. In step 1005, the UE receives information associated with a cell controlled by a base station, wherein the information is related to when a beam (or a beam group) of the cell will be generated. In step 1010, the UE determines whether to perform a transmission in the cell based on at least the information. In one embodiment, the UE also receives a configuration associated with the transmission in the cell. The UE could determine whether to perform the transmission in the cell based further on the configuration associated with the transmission.

Referring back to FIGS. 3 and 4, in one embodiment from the perspective of a UE, the device 300 includes a program code 312 stored in memory 310 of the transmitter. The CPU 308 could execute program code 312 (i) to receive information associated with a cell controlled by a base station, wherein the information is related to when a beam (or a beam group) of the cell will be generated, and (ii) to determine whether to perform a transmission in the cell based on at least the information. In one embodiment, the CPU 308 could further execute program 312 to receive a configuration associated with the transmission in the cell and determine whether to perform the transmission in the cell based further on the configuration associated with the transmission. In addition, the CPU 308 can execute the program code 312 to perform all of the above-described actions and steps or others described herein.

Based on above embodiments or methods, efficiency of a Random Access procedure and detecting beam(s) for a UE can be improved. Unnecessary UE power consumption and signaling missing due to dynamical beam generation can be prevented.

In general, sounding reference signal (SRS) is a reference signal for frequency selective scheduling. Through monitoring SRS, eNB can estimate the UL channel quality and choose proper frequency resource(s) for a UE with proper modulation and coding scheme. SRS can be configured to transmit periodically, as discussed in 3GPP 36.213 V12.3.0. Also, SRS can be triggered aperiodically by a PDCCH with preconfigured occasion/resource, as discussed in 3GPP 36.213 V12.3.0. To support measurement for most part of the system bandwidth, SRS can be configured to hopping for one sub-band to another sub-band in different SRS occasions, as discussed in 3GPP 36.213 V12.3.0. For TDD (Time Division Duplex), due to the reciprocity of UL and DL channel, SRS can also be used to estimate the DL channel quality, as a substitute of channel state information (CSI) reporting.

A beam set of a UE is generally the beam(s) that the UE could communicate with the base station. To fully utilize the benefit of BDMA (Beam Division Multiple Access), the base station has to know the beam set of the UE. One way of finding the beam set of a UE is to detect uplink transmission from that UE. For example, when UE perform a RA procedure, eNB may detect preamble(s) from a UE on each beam to know the signal from the UE would arrive on which beam. It is possible that not all the beams where signal can be observed from a UE would be considered as being in the beam set of the UE. It is possible to remove weak beam(s)

which is inefficient to use or which would cause negligible interference to other UE on that beam(s).

As a result, a criteria may be defined to judge whether a beam is qualified as a beam set of a UE. An example can be a beam with a signal strength that is 20 dB lower than the signal strength of the strongest beam of the UE would not be considered as a qualified beam, and would not be included in the UE's beam set. On the other hand, a beam with a signal strength that is 15 dB lower than signal strength of the strongest beam of the UE would be considered a qualified beam, and would be included in the UE's beam set. In other words, a signal strength threshold may be defined to determine whether a particular beam should be included in the UE's beam set.

When base station detects a preamble on one beam from a UE, not all qualified beam could be detected within the same attempt(s) (e.g., due to insufficient power or channel condition on certain beam). In some cases, multiple preamble attempts with the same power level may be needed to scan and find all the beams of a cell. Furthermore, the preamble power would increase from attempt to attempt, while the current power level of the preamble may lead to successful detection of some beam and unsuccessful detection of other beams. For example, stronger beams would be detected earlier while weaker beams that qualify would not be detected. One way to complete the beam set is to trigger subsequent reference signal transmission from the UE so that eNB could detect all the beams.

After detection of a beam set is completed, it is still possible that the beam set would change (e.g., due to UE's mobility, environment change, or something else). It would be beneficial for eNB to continue monitoring and updating the beam set of a UE. A beam tracking procedure could be applied to keep track of the beam set of the UE.

One way to keep track of the UE's beam set is to let the UE transmits a reference signal every certain period. An example of the reference signal is the SRS discussed in 3GPP TS 36.213 V12.3.0. The reference signal for beam tracking could be configured to transmit periodically wherein the periodicity could be set according to the rate of beam change (e.g., the UE's mobility). The reference signal could also be triggered aperiodically (e.g., by PDCCH). Aperiodic reference signal has quick response, high adaptability, and high multiplexing complexity. Periodic reference signal is consistent and generally requires less control signaling overhead.

A base station or a cell may not utilize all available beams at the same time due to hardware limitation. If there is such limitation, more transmissions would be needed to scan all the beams of a cell to find out the beam set of a UE. As an example, a cell has 9 beams in total and can generate (transmit/receive) three beams at the same time. First, beams 1, 4, and 7 are generated. Then beams 2, 5, and 8 are generated. Finally, beams 3, 6, and 9 are generated. To scan all the beam of the cell, the UE would need to conduct transmissions on three occasions or transmission opportunities.

When there is a limitation on the maximum beam number, eNB cannot monitor all the beams within one transmission of reference signal. Therefore, multiple reference signal transmissions within a certain period are needed for beam tracking. To efficiently trigger aperiodic reference signals for beam tracking, one PDCCH could correspond to multiple reference signal transmissions. For example, if eNB could generate one fourth of its beams at one time, four different occasions would be needed to scan all the beams. Therefore, one PDCCH could correspond to four reference signal transmissions in which each reference signal transmission corresponds to a portion of the beams of the cell. However, if the beams corresponding to one transmission is unlikely to be part of the beam set of the UE, the transmission would be wasted. In one example, the probability of one beam present in the beam set of the UE is according to the UE's location. In another example, the probability of one beam present in the beam set of the UE is according to the current beam set of the UE. Furthermore, the UE would unnecessarily waste power. Also, the reference signal resource would also be wasted.

In one embodiment, the general concept of the invention is that when eNB trigger multiple reference signal transmissions with one triggering signal, eNB controls which occasions are triggered and which occasions are not triggered. Also, upon receiving the triggering signal to trigger the reference signal transmission, the UE could determine which occasions the UE would perform reference signal transmission and which occasions the UE would not perform reference signal transmission. The UE could then perform the reference signal transmission accordingly. For example, if one triggering signal corresponds to four occasions of reference signal transmission, eNB could instruct the UE to transmit the reference signal of the first and the third occasions and not transmit the reference signal on the second and the fourth occasions. The UE would then follow the instruction provided by eNB.

Figure 11:
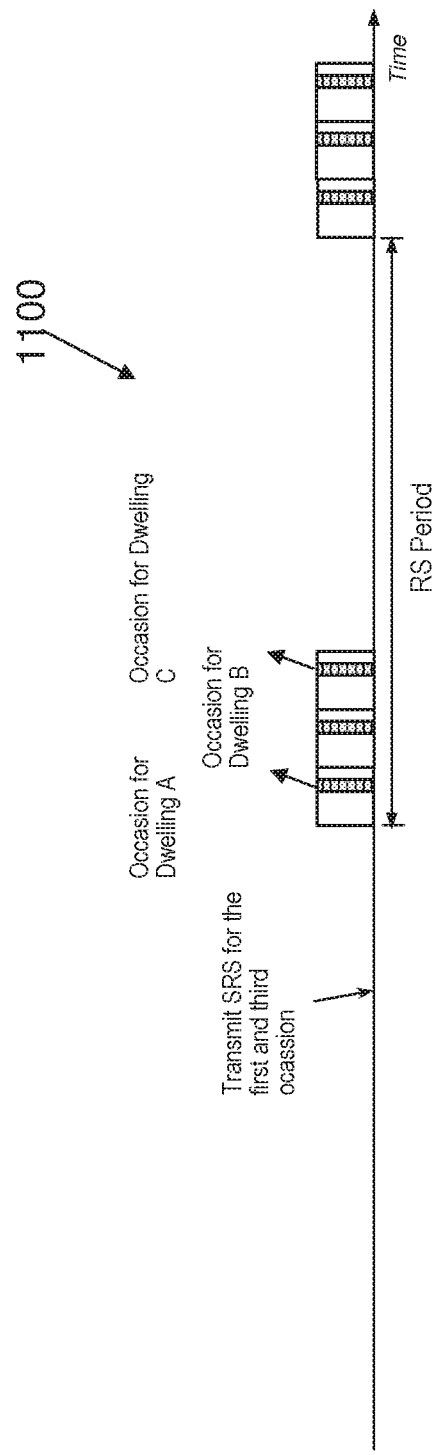
FIG. 11 is a flow chart according to one exemplary embodiment.

A dwelling is a set of beams which could be generated at a same time. FIG. 11 illustrates an example where three occasions for three sets of beams (or dwellings) are provided.

In one embodiment, the triggering signal to trigger the reference signal transmission on multiple occasions could be a PDCCH. More specifically, the PDCCH can be a UL grant or a downlink assignment. Alternatively, the triggering signal could be a RAR (Random Access Response). The triggering signal could also be a PDCCH order, a MAC control element, or a RRC (Radio Resource Control) signaling.

In one embodiment, a bit map could be used to mark which occasions are triggered and which occasions are not triggered. For example, a binary bit map of "101" means that the first and third occasions are triggered while the second occasion is not triggered.

In another embodiment, the information is based on an indication where the mapping between the indication and whether to transmit each occasion can be configured, e.g. "01" means the first and second occasions are triggered and the third one is not, "10" means the first one and the third one are triggered and the second one is not.

In one embodiment, the reference signal could be a SRS, a preamble, or a demodulation reference signal. In addition, the reference signal could be a reference signal for beam tracking. Alternatively, the reference signal could be a reference signal for beam identification.

Figure 12:
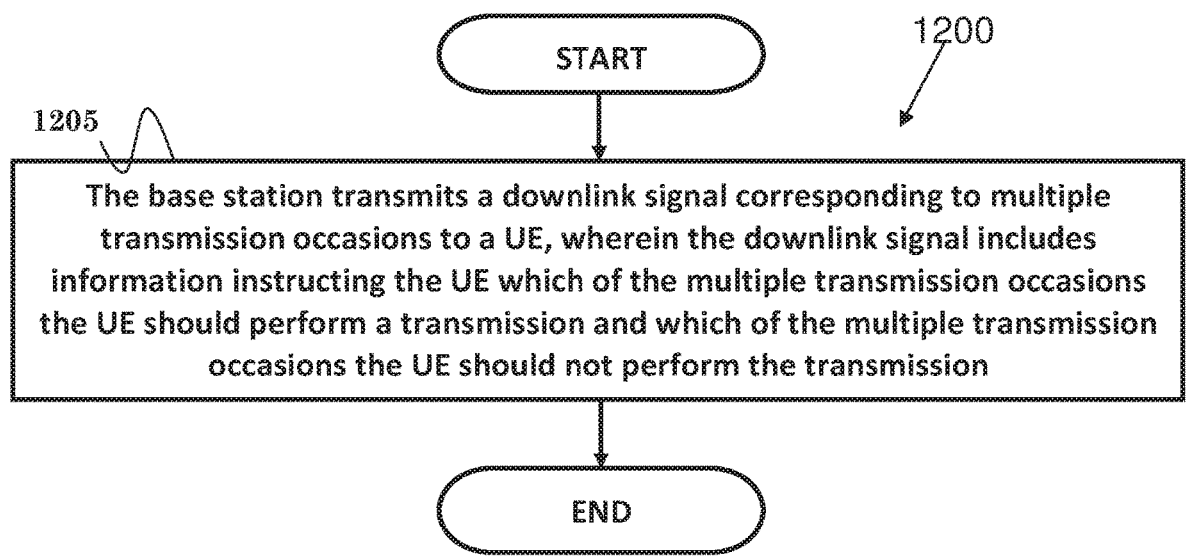
FIG. 12 is a flow chart according to one exemplary embodiment.

FIG. 12 is a flow chart 1200, in accordance with one exemplary embodiment from the perspective of a base station. In step 1205, the base station transmits a downlink signal corresponding to multiple transmission occasions to a UE, wherein the downlink signal includes information instructing the UE which of the multiple transmission occasions the UE should perform a transmission and which of the multiple transmission occasions the UE should not perform the transmission.

In one embodiment, the transmission is a reference signal transmission for beam identification or beam tracking. Furthermore, the reference signal could be a SRS, a demodulation reference signal, or a preamble.

Referring back to FIGS. 3 and 4, in one embodiment from the perspective of a base station, the device 300 includes a program code 312 stored in memory 310 of the transmitter. The CPU 308 could execute program code 312 to transmit a downlink signal corresponding to multiple transmission occasions to a UE, wherein the downlink signal includes information instructing the UE on which of the multiple transmission occasions the UE should perform a transmission and on which of the multiple transmission occasions the UE should not perform the transmission. In addition, the CPU 308 can execute the program code 312 to perform all of the above-described actions and steps or others described herein.

Figure 13:
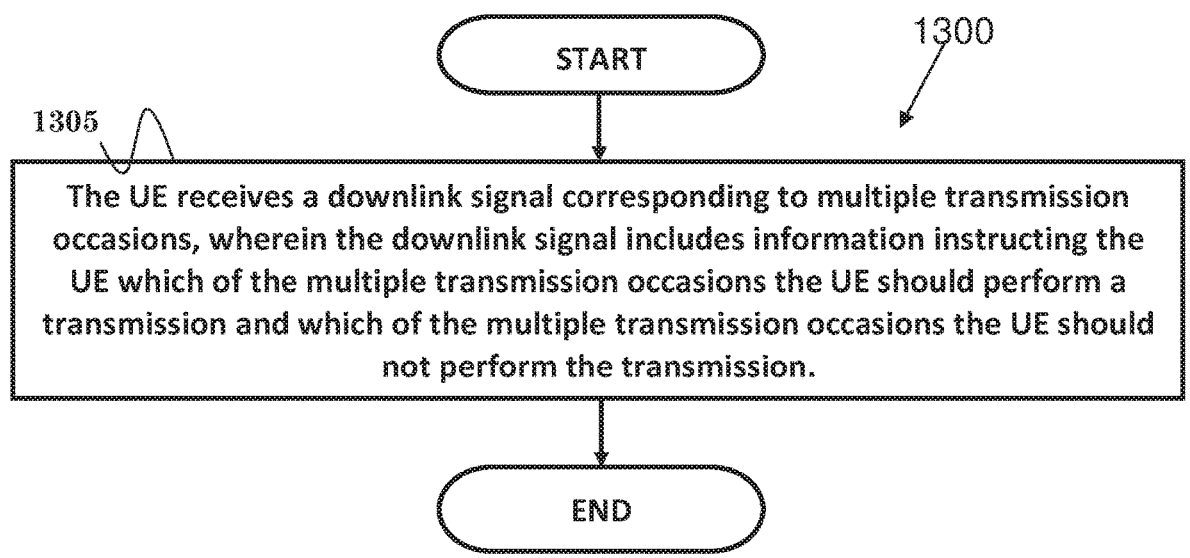
FIG. 13 is a flow chart according to one exemplary embodiment.

FIG. 13 is a flow chart 1300, in accordance with one exemplary embodiment from the perspective of a UE. In step 1305, the UE receives a downlink signal corresponding to multiple transmission occasions, wherein the downlink signal includes information instructing the UE which of the multiple transmission occasions the UE should perform a transmission and which of the multiple transmission occasions the UE should not perform the transmission.

In one embodiment, the transmission is a reference signal transmission for beam identification or beam tracking. Furthermore, the reference signal could be a SRS, a demodulation reference signal, or a preamble.

Referring back to FIGS. 3 and 4, in one embodiment from the perspective of a UE, the device 300 includes a program code 312 stored in memory 310 of the transmitter. The CPU 308 could execute program code 312 to receive a downlink signal corresponding to multiple transmission occasions, wherein the downlink signal includes information instructing the UE on which of the multiple transmission occasions the UE should perform a transmission and on which of the multiple transmission occasions the UE should not perform the transmission. In addition, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a User Equipment (UE), comprising:
   the UE receives a downlink signal to trigger a transmission(s) of a sounding reference signal,
   wherein multiple transmission time occasions are available for the sounding reference signal within a periodicity of the sounding reference signal, wherein the multiple transmission time occasions are used to scan all beams of a base station and the downlink signal corresponds to the multiple transmission time occasions,
   wherein the downlink signal includes information instructing the UE which of the multiple transmission time occasions the UE is to perform the transmission(s) for some beams among all beams of the base station and which of the multiple transmission time occasions the UE is not to perform the transmission(s) for other beams among all beams of the base station, and
   wherein a number of the multiple transmission time occasions is equal to a number of transmission time occasions the base station needs to scan all beams of the base station.

2. The method of claim 1, wherein the sounding reference signal is a reference signal for beam identification.

3. The method of claim 1, wherein the information is carried on a bit map.

4. The method of claim 1, wherein the information is carried on an indication and a mapping between the indication and whether to transmit each transmission time occasion is configured.

5. The method of claim 1, wherein one transmission time occasion corresponds to a portion of beams of the base station.

6. The method of claim 1, wherein one transmission time occasion is associated with a set of beams the base station can generate to monitor simultaneously.

7. The method of claim 1, wherein the sounding reference signal is configured for hopping from a first sub-band to a second sub-band.

8. The method of claim 1, wherein the downlink signal is a PDCCH (Physical Downlink Control Channel).

9. The method of claim 1, wherein the multiple transmission time occasions are on a cell.

10. The method of claim 1, wherein the sounding reference signal is a reference signal for beam tracking.

11. A User Equipment (UE), comprising:
    a control circuit;
    a processor installed in the control circuit; and
    a memory installed in the control circuit and operatively coupled to the processor;
    wherein the processor is configured to execute a program code stored in the memory to:
      receive a downlink signal to trigger a transmission(s) of a sounding reference signal,
      wherein multiple transmission time occasions are available for the sounding reference signal within a periodicity of the sounding reference signal, wherein the multiple transmission time occasions are used to scan all beams of a base station and the downlink signal corresponds to the multiple transmission time occasions,
      wherein the downlink signal includes information instructing the UE which of the multiple transmission time occasions the UE is to perform the transmission(s) for some beams among all beams of the base station and which of the multiple transmission time occasions the UE is not to perform the transmission(s) for other beams among all beams of the base station, and
      wherein a number of the multiple transmission time occasions is equal to a number of transmission time occasions the base station needs to scan all beams of the base station.

12. The UE of claim 11, wherein the sounding reference signal is a reference signal for beam identification.

13. The UE of claim 11, wherein the information is carried on a bit map.

14. The UE of claim 11, wherein the information is carried on an indication and a mapping between the indication and whether to transmit each transmission time occasion is configured.

15. The UE of claim 11, wherein one transmission time occasion corresponds to a portion of beams of the base station.

16. The UE of claim 11, wherein one transmission time occasion is associated with a set of beams the base station can generate to monitor simultaneously.

17. The UE of claim 11, wherein the sounding reference signal is configured for hopping from a first sub-band to a second sub-band.

18. The UE of claim 11, wherein the downlink signal is a PDCCH (Physical Downlink Control Channel).

19. The UE of claim 11, wherein the multiple transmission time occasions are on a cell.

20. The UE of claim 11, wherein the sounding reference signal is a reference signal for beam tracking.

* * * * *